United States Patent [19]

McLaughlin

[11] Patent Number: 4,549,311
[45] Date of Patent: Oct. 22, 1985

[54] METHOD AND APPARATUS FOR MEASURING THE STRENGTH OF A RADIO SIGNAL FREQUENCY

[75] Inventor: Michael J. McLaughlin, Hoffman Estates, Ill.

[73] Assignee: Motorola, Inc., Schaumburg, Ill.

[21] Appl. No.: 714,063

[22] Filed: Mar. 20, 1985

Related U.S. Application Data

[63] Continuation of Ser. No. 405,123, Aug. 3, 1982, abandoned.

[51] Int. Cl.[4] .......................................... H04B 7/08
[52] U.S. Cl. .................................... 455/277; 455/52; 455/62; 455/166
[58] Field of Search ................ 455/52, 62, 67, 10, 455/133–135, 166, 277, 278; 375/100

[56] References Cited

U.S. PATENT DOCUMENTS

| | | |
|---|---|---|
| 2,985,755 | 5/1961 | Giesselman . |
| 3,155,909 | 11/1964 | Shepherd . |
| 3,328,698 | 6/1967 | Schreder . |
| 3,537,011 | 10/1970 | Escoula .......................... 455/134 |
| 3,564,287 | 2/1971 | Todd .............................. 324/103 P |
| 3,663,762 | 5/1972 | Joel, Jr. . |
| 3,761,822 | 9/1973 | Richardson et al. . |
| 3,764,915 | 10/1973 | Cox et al. . |
| 3,819,872 | 6/1974 | Hamrick . |
| 3,860,872 | 1/1975 | Richardson et al. ............ 455/135 |
| 3,896,375 | 7/1975 | Trolliet ........................... 324/103 P |
| 3,906,166 | 9/1975 | Cooper et al. . |
| 3,913,017 | 10/1975 | Imaseki . |
| 3,937,943 | 2/1976 | Debrunner et al. . |
| 3,962,553 | 6/1976 | Linder et al. . |
| 3,973,197 | 8/1976 | Meyer ............................ 324/103 P |
| 3,984,776 | 10/1976 | Stedman . |
| 4,025,853 | 5/1977 | Addeo . |
| 4,029,900 | 6/1977 | Addeo . |
| 4,053,840 | 10/1977 | Baron ............................. 307/353 |
| 4,054,786 | 10/1977 | Vincent .......................... 364/575 |
| 4,069,455 | 1/1978 | Sherman, Jr. ................... 455/226 |
| 4,092,600 | 5/1978 | Zimmermann et al. . |
| 4,101,836 | 7/1978 | Craig et al. . |
| 4,144,412 | 3/1979 | Ito et al. ......................... 179/2 EB |
| 4,183,087 | 1/1980 | Huelsman ....................... 328/151 |
| 4,268,722 | 5/1981 | Little et al. ..................... 179/2 EB |
| 4,295,099 | 10/1981 | Evans ............................. 324/103 P |
| 4,302,845 | 11/1981 | McClaughry et al. .......... 375/82 |
| 4,309,773 | 1/1982 | Johnson et al. ................. 455/62 |
| 4,312,074 | 1/1982 | Pautler et al. ................... 375/96 |
| 4,317,229 | 2/1982 | Craig et al. ..................... 455/277 |

FOREIGN PATENT DOCUMENTS

| | | |
|---|---|---|
| 2803356 | 8/1978 | Fed. Rep. of Germany ... 324/103 P |
| 0030654 | 3/1981 | Japan .............................. 324/103 P |

OTHER PUBLICATIONS

National Semiconductor "ADC0801, ADC0802, ADC0803, ADC0804 8-Bit µP Compatible A/D Converters", Jan. 1981, pp. 1–3, 14–19.
"Motorola DYNATAC Cellular Radiotelephone Systems", Motorola Inc., Schaumburg, Ill., 1982.
"DYNATAC Cellular Mobile Telephone System Base Station," Motorola Inc. Instruction Manual No. 68P81060E30, Motorola Inc., Schaumburg, Ill., 1981.

*Primary Examiner*—Marc E. Bookbinder
*Attorney, Agent, or Firm*—Rolland R. Hackbart; Donald B. Southard

[57] ABSTRACT

An improved method and apparatus for measuring the strength of a radio frequency (RF) signal subject to Rayleigh fading is described. The strength of the RF signal is sampled two or more times during a predetermined time interval and the sampled signal strength having the largest magnitude is selected. The selected signal strength is a reasonably accurate measure of the signal strength since the true average strength of a Rayleigh fading signal is close to its peak signal strength. The inventive method and apparatus is particularly well adapted for use in a scanning receiver located in a base station radio of a cellular radiotelephone communications system. The scanning receiver includes an antenna selector for selecting one of a plurality of sector antennas, an RF signal receiver tunable to a plurality of different RF signal frequencies, an analog-to-digital converter for converting RF signal strength samples to a binary data signal, and a microprocessor together with peripheral devices for controlling the operation of the antenna selector, RF signal receiver and analog-to-digital converter.

30 Claims, 4 Drawing Figures

METHOD AND APPARATUS FOR MEASURING THE STRENGTH OF A RADIO SIGNAL FREQUENCY

This is a continuation of application Ser. No. 405,123, filed Aug. 3, 1982 now abandoned.

RELATED PATENT APPLICATIONS

The present invention is related to co-pending U.S. patent application, U.S. patent application Ser. No. 576,805 (corresponding to U.S. Pat. No. 4,485,486) entitled "Method and Apparatus for Assigning Duplex Radio Channels and Scanning Duplex Radio Channels Assigned to Mobile and Portable Radiotelephones in a Cellular Radiotelephone System", invented by Larry C. Puhl and Ronald J. Webb, and assigned to same assignee and filed the same date as the instant invention. By reference thereto, the foregoing related U.S. patent application is incorporated in its entirety into the written description of the present invention.

BACKGROUND OF THE INVENTION

The present invention relates generally to radio frequency (RF) signal strength measuring apparatus, and more particularly to an improved method and apparatus for measuring the strength of an RF signal subject to rapid and deep fading, such as Rayleigh fading.

In the prior art, the strength of RF signals has been determined by averaging a number of samples taken either by an analog meter or an analog-to-digital converter. The resulting signal strength is reasonably accurate as long as the RF signal is not subject to rapid and deep fading. However, if an RF signal is subject to rapid and deep fading and only a few signal strength samples are taken, a signal strength sample taken during a deep fade will cause a large error in the computed average signal strength. The effects of a sample taken during a deep fade can be alleviated somewhat by taking a large number of samples over a relatively long time interval. However, in radio systems where it is necessary to quickly measure the signal strength of many different RF signals subject to Rayleigh fading, the average of a small number of signal strength samples will not accurately reflect the true average signal strength due to the errors introduced by samples taken during deep fades.

SUMMARY OF THE INVENTION

Accordingly, it is an object of the present invention to provide an improved method and apparatus for accurately measuring in a relatively short time period the strength of an RF signal subject to rapid and deep fading.

It is another object of the present invention to provide an improved method and apparatus for accurately measuring the signal strength of a plurality of RF signals that are being received by a plurality of antennas.

Briefly described, the present invention encompasses a method for measuring the signal strength of an RF signal that is subject to Rayleigh fading. The inventive method comprises the steps of sampling the strength of an RF signal N times over a predetermined time interval, where N is an integer number greater than one, and selecting the sampled signal strength having the largest magnitude. The sample having the largest magnitude is a good estimate of the signal strength, since the true average signal strength is reasonably close to the peak signal strength and is relatively unaffected by the Rayleigh fading. Improved apparatus for measuring the strength of an RF signal comprises a receiver for receiving an RF signal, circuitry for sampling the received RF signal N times over a predetermined time interval, where N is an integer number greater than one, and circuitry for selecting the sampled signal strength having the largest magnitude.

DETAILED DESCRIPTION OF THE PREFERRED EMBODIMENT

Figure 1:
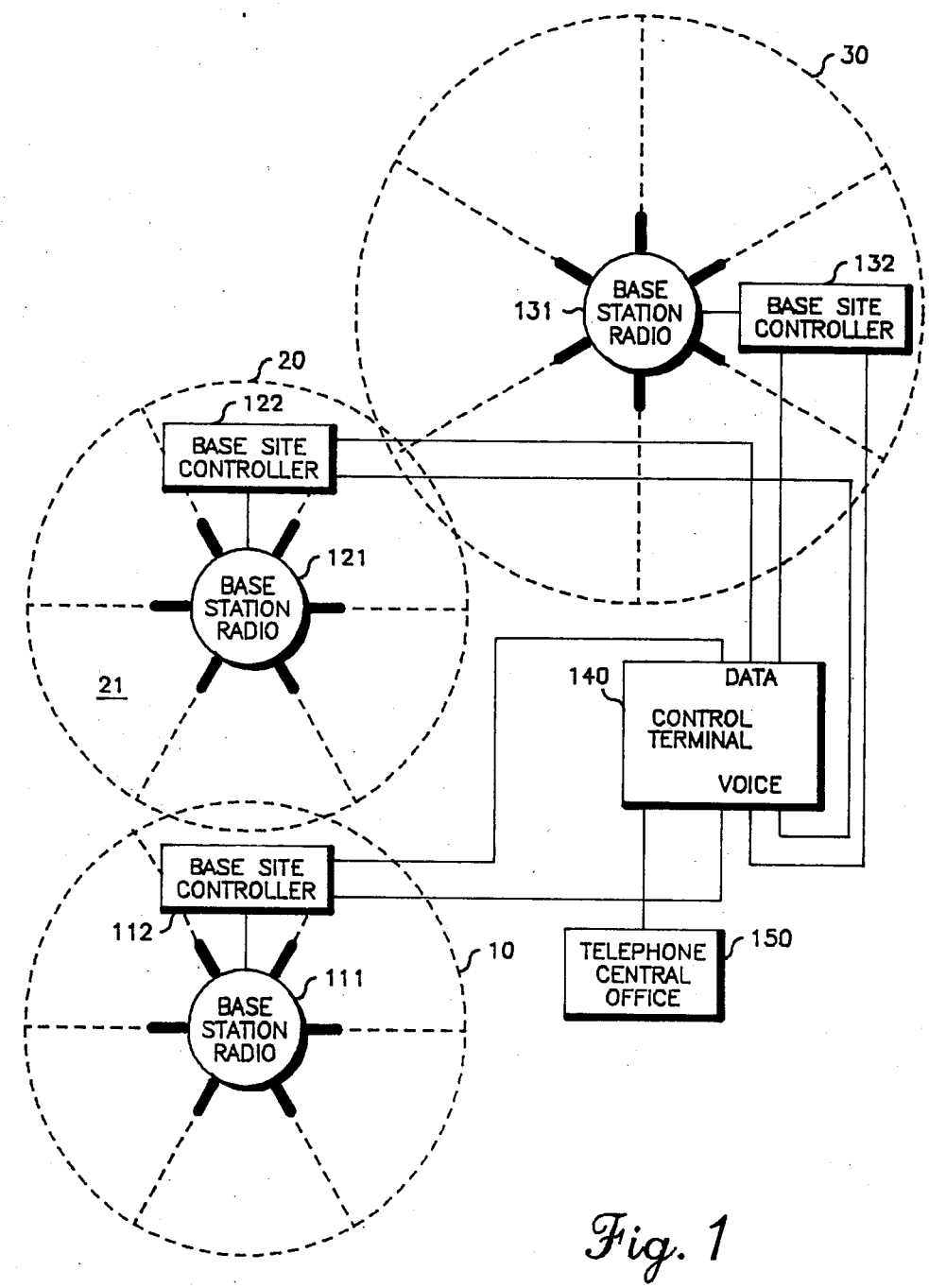
FIG. 1 is a block diagram of a radio communications system that may advantageously utilize the signal strength measuring apparatus of the present invention.

Referring to FIG. 1, there is illustrated a cellular radiotelephone communications system of the type described in U.S. Pat. Nos. 3,663,762, 3,906,166; in an experimental cellular radiotelephone system application filed under Docket No. 18262 with the Federal Communications Commission by Motorola and American Radio-Telephone Service, Inc. in February 1977; and more recently in a system description entitled "Motorola DYNATAC Cellular Radiotelephone Systems", published by Motorola, Inc., Schaumburg, Ill., in 1982. Such cellular systems can provide telephone coverage to both mobile and portable radiotelephones located throughout a large geographical area. Portable radiotelephones may be of the type described in U.S. Pat. No. 3,962,553 and 3,906,166 and in U.S. patent application Ser. No. 187,304 (now U.S. Pat. No. 4,486,624, filed Sept. 15, 1980, invented by Larry C. Puhl et al, entitled "Microprocessor Controlled Radiotelephone Transceiver", and assigned to the instant assignee; and mobile radiotelephones may be of the type described in Motorola instruction manual number 68P81039E25, published by Motorola Service Publications, Schaumburg, Ill., 1979. The geographical area may be subdivided into cells 10, 20 and 30, which each may include a base station radio 111, 121 and 131 and an associated base site controller 112, 122 and 132. Base site controllers 112, 122 and 132 are each coupled by data and voice links to a radiotelephone control terminal 140, which may be similar to the terminals described in U.S. Pat. Nos. 3,663,762, 3,764,915, 3,819,872, 3,906,166 and 4,268,722. These data and voice links may be provided by dedicated wire lines, pulse-code-modulated carrier lines, microwave radio channels, or other suitable communication links. Control terminal 140 is in turn coupled to a conventional telephone central office 150 for completing telephone calls between mobile and portable radiotelephones and landline telephones.

Each base station radio 111, 121 and 131 in FIG. 1 includes a plurality of transmitters and receivers for operating on at least one duplex signalling channel and a plurality of duplex voice channels. Base station 111, 121 and 131 may be of the type described in Motorola instruction manual number 68P81060E30, published by Motorola Service Publications, Motorola, Inc., Schaumburg, Ill., in 1982. Base station radios 111, 121 and 131 are located substantially at the center of each of the corresponding cells 10, 20 and 30. The base station transmitters may be combined onto one omni-directional antenna, while the base station receivers may be intercoupled to two or more directional or omni-directional sector antennas. In FIG. 1, the base station radios 111, 121 and 131 each include six 60° sector antennas. Each sector antenna primarily covers a portion of a cell, such as portion 21 of cell 20, and typically has a coverage area that overlaps the coverage area of adjacent sector antennas. Since the signalling channel requires an omni-directional receiving pattern, the signals received by the six sector antennas may be combined by a maximal ratio predetection diversity combiner, as illustrated and described in the instant assignee's co-pending U.S. patent applications: Ser. No. 22,757, (now U.S. Pat. No. 4,369,520) filed on Mar. 22, 1979, entitled "Instantaneously Acquiring Sector Anntena System" and invented by Frank J. Cerny, Jr. and James J. Mikulski; and Ser. No. 268,613, filed on June 1, 1981, now abandoned in favor of Ser. No. 493,802, filed on May 12, 1983, which is also now abandoned in favor of Ser. No. 580,775, filed on Feb. 21, 1984, entitled "Large Dynamic Range Multiplier for a Maximal-Ratio Diversity Combiner", and invented by Frank J. Cerny, Jr. Furthermore, coverage of a portion of a cell may be provided by combining the signals received by two or more of the sector antennas. The sector antennas and associated receiving apparatus may be of the type described in U.S. Pat. Nos. 4,101,836 and 4,317,229.

In order to determine whether or not a mobile or portable radiotelephone leaves one cell, e.g. 20, and enters another, e.g. 10 or 30, the signal strength of the mobile or portable radiotelephone must be monitored by the base site controller 122. When the signal stength of a mobile or portable radiotelephone becomes too weak, the mobile or portable radiotelephone can be handed off to a base site controller 112 or 132 in another cell. Hand off involves transferring a particular mobile or portable radiotelephone from a duplex voice channel in one cell to a duplex voice channel in another cell. By utilizing the present invention, the strength of an RF signal can be quickly and accurately measured for each operating mobile and portable radiotelephone so that a particular mobile or portable radiotelephone can be reliably handed off before communications with it are degraded or interrupted due to weak signal conditions.

Figure 3:
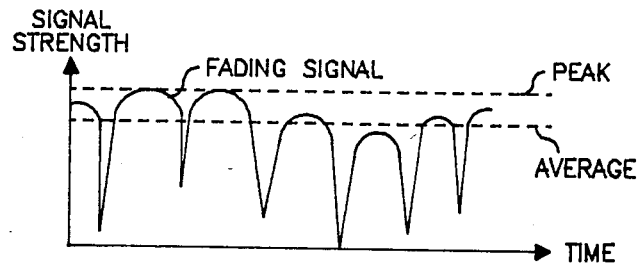
FIG. 3 illustrates the envelope of an RF signal that is experiencing Rayleigh fading.

Since the RF signal frequencies utilized in the cellular system in FIG. 1 are typically above 800 mHz, the RF signals are subject to random, deep and rapid fading, commonly referred to as Rayleigh fading. Thus, the problem of accurately determining the strength of RF signals from mobile and portable radiotelephones is complicated not only by the fact that there may be a large number of mobile and portable radiotelephones to monitor, but also by the fact that the RF signal from the mobile and portable radiotelephones is subject to Rayleigh fading. In other words, the base site controllers 112, 122 and 132 must be capable of rapidly and accurately measuring the signal strength from a large number of mobile and portable radiotelephones to prevent communications with them from being unacceptably degraded or interrupted. By utilizing the present invention, a reasonably accurate measure of the signal strength from operating mobile and portable radiotelephones can be obtained by sampling the strength of the RF signal from each mobile and portable radiotelephone at least two times during a predetermined time interval and selecting the sampled signal strength for each that has the largest magnitude. As illustrated by the RF signal envelope in FIG. 3, the peak signal strength for each mobile and portable radiotelephone is a reasonably accurate measure of the signal strength since the peak signal strength is relatively close to the true average signal strength. Moreover, the peak signal strength is closer to the true average signal strength than an average of a number of signal strength samples that includes a sample taken in a null. Thus, according to the present invention, a scanning receiver can be coupled to the sector antennas of each base station radio 111, 121, and 131 for periodically measuring the peak signal strength of each operating mobile and portable radiotelephone in each cell 10, 20 and 30.

Figure 2:
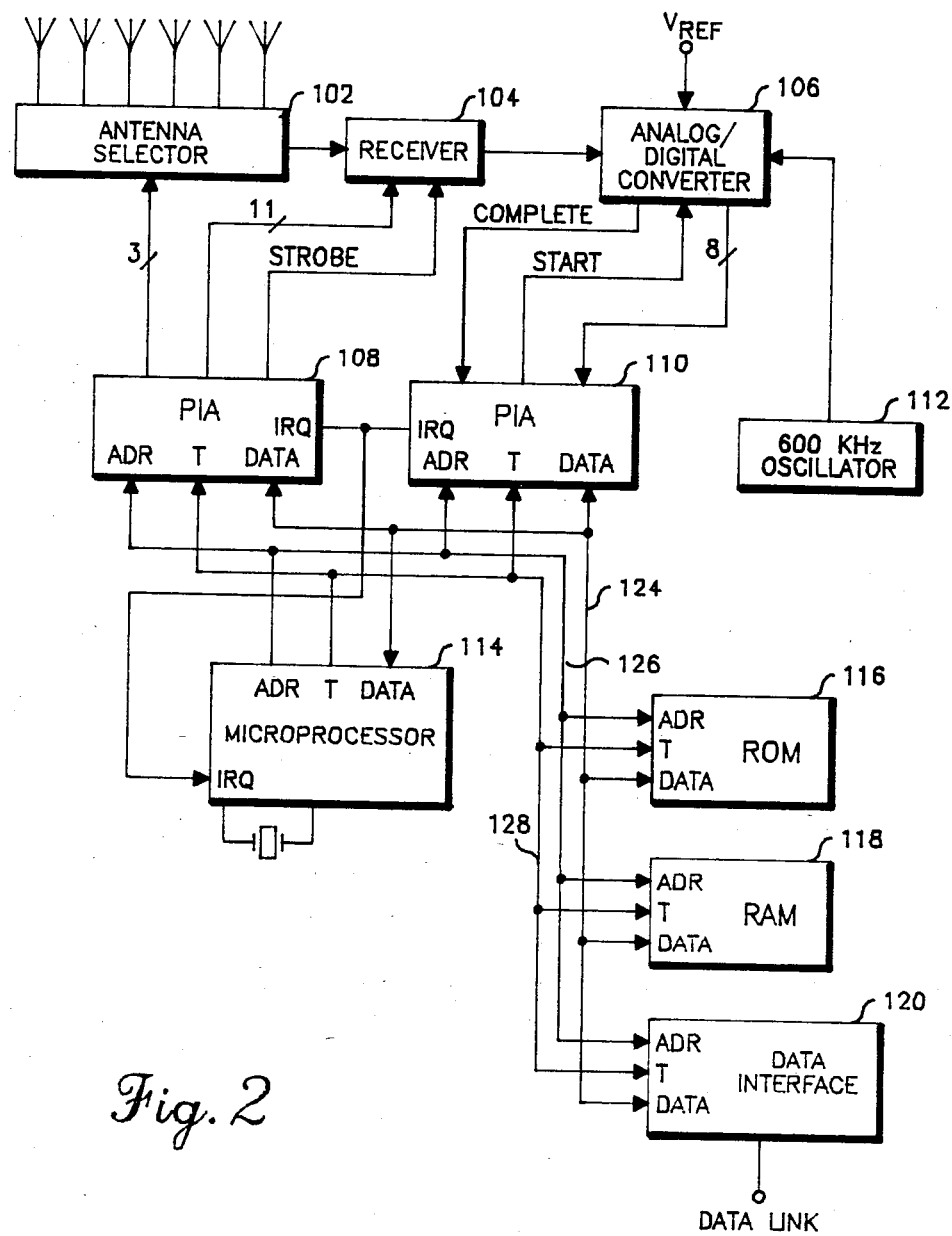
FIG. 2 is a block diagram of a scanning receiver including signal strength measuring apparatus embodying the present invention.

Referring to FIG. 2, there is illustrated a scanning receiver embodying the present invention. The scanning receiver may be part of base station radios 111, 121 and 131 in FIG. 1. The scanning receiver in FIG. 2 includes an antenna selector 102 that is coupled to each of six sector antennas of the base station radio. Binary input signals applied to antenna selector 102 by peripheral interface adapter (PIA) 108 cause antenna selector 102 to couple a selected one of the six sector antennas to receiver 104. The sector antennas and antenna selector 102 may be any conventional apparatus, such as that described in the aforementioned U.S. Pat. Nos. 4,101,836 and 4,317,229.

Receiver 104 may be a conventional synthesized receiver (such as the scanning receiver in the aforementioned Motorola instruction manual no. 68P81060E30), whose frequency of reception may be determined by an eleven-bit data signal applied to receiver 104 by PIA 108. The eleven-bit data signal is strobed into a register (not shown) of receiver 104 by a strobe signal from PIA 108. An output from receiver 104, which is proportional to the instantaneous strength of the RF signal being received (eg., such as the output of an envelope detector), is coupled to analog-to-digital converter (ADC) 106, which converts the magnitude of the receiver output to an eight-bit data signal. ADC 106 is controlled by PIA 110, which applies a start signal to ADC 106 for initiating the analog-to-digital conversion process. ADC 106 is also coupled to 600 kHz oscillator 112, and completes a conversion in approximately 120 microseconds. When the analog-to-digital conversion is complete, a complete signal is applied to PIA 110 by ADC 106. ADC 106 may be any suitable conventional analog-to-digital converter, such as, for example, an ADC0803 manufactured by National Semiconductor Corp.

The operation of the scanning receiver in FIG. 2 is controlled by microprocessor 114. Microprocessor 114 may be any sutiable conventional microprocessor, such as, for example, a Motorola type MC6800 microprocessor. At predetermined time intervals, microprocessor 114 executes the flow chart in FIG. 4 for measuring the signal strength of all active mobile and portable radiotelephones in its cell. Upon completion of the flowchart in FIG. 4, microprocessor 114 has measured and stored the signal strength for each active mobile and portable radiotelephone and has determined which of the six sector antennas is receiving the strongest RF signal from each active mobile and portable radiotelephone.

Microprocessor 114 is intercoupled to PIA's 108 and 110, read only memory (ROM) 116, random access memory (RAM) 118 and data interface 120 by way of data bus 124, address bus 126 and timing signals 128. ROM 116 stores a control program including subroutines for measuring the signal strength of active mobile and portable radiotelephones, such as the subroutine in the Appendix hereinbelow. RAM 118 is a scratch pad memory used during execution of the control program amd subroutines. Data interface 120 provides a conventional data link between the scanning receiver in FIG. 2 and other processing circuitry in the base site controllers 112, 122 and 132 in FIG. 1. Microprocessor 114, PIA's 108 and 110, ROM 116, RAM 118, data interface 120 can each be provided by conventional integrated circuit devices, such as those described in the "Motorola Microprocessor Data Manual", published by the MOS Integrated Circuits Group of the Microprocessor Division of Motorola, Inc., Austin, Tex. in 1981. For example, microprocessor 114 may be a Motorola type MC6800 microprocessor, PIA's 108 and 110 a Motorola type MC6821 peripheral interface adapter, ROM 116 a Motorola type MCM68A316 2KX8 ROM, RAM 118 two Motorola type MCM2114 1KX4 RAM's, and data interface 120, a Motorola type MC6850 or MC6852 data adapter.

Figure 4:
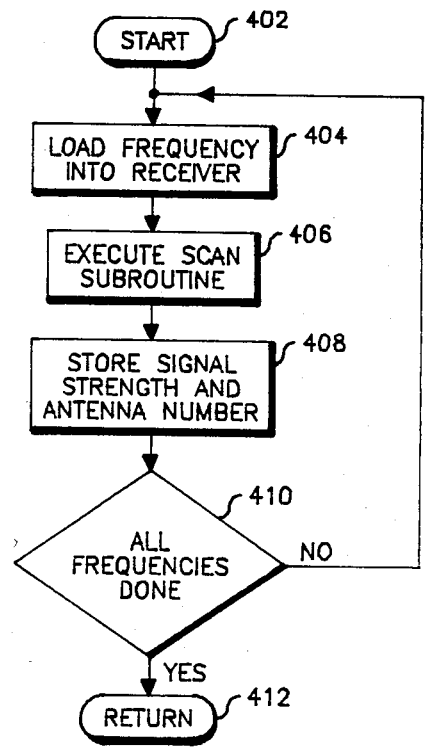
FIG. 4 is a flow chart illustrating the signal strength measuring method of the present invention.

Referring to FIG. 4, a flow chart of the control program for microprocessor 114 in FIG. 2 is illustrated. The flow chart may be executed periodically with all of the transmitting frequencies of active mobile and portable radiotelephones. Entering at START block 402, and proceeding to block 404, one of the active frequencies is loaded into receiver 104 in FIG. 2. Next, at block 406, the SCAN subroutine in the Appendix hereinbelow is executed. The SCAN subroutine samples each sector antenna a number of times determined by the variable COUNT and stores the largest sample for each sector antenna sequentially beginning at address IDAT. The scanning is repeated twenty-five times to provide some time diversity between signal strength measurements for each sector antenna. Then, at block 408, the sector antenna having the largest sample is identified by comparing the six samples stored at addresses IDAT, IDAT+1, IDAT+2, IDAT+3, IDAT+4 and IDAT+5. The selected sector antenna and its sampled signal strength may be stored in a location associated with the mobile or portable radiotelephone operating on the particular frequency. Next, at decision block 410, a check is made to see if all operating frequencies have been scanned. If all operating frequencies have been scanned, YES branch is taken to RETURN block 412. Otherwise, NO branch is taken to block 404 for scanning the next operating frequency.

In summary, an improved method and apparatus for accurately measuring in a relatively short period of time the strength of an RF signal subject to Rayleigh fading has been described. The inventive method and apparatus is particularly well adapted for use in cellular radiotelephone systems, where it necessary to quickly and accurately measure the signal strength of mobile and portable radiotelephones so that communications with them can be maintained as they move from cell to cell.

APPENDIX

Table I hereinbelow illustrates a suitable program for the SCAN subroutine referred to in block 406 in the flow chart in FIG. 4. The program is coded in mnemonic instructions for the Motorola type MC6800 microprocessor, which mnemonic instructions can be assembled into machine code instructions by a suitable assembler. The mnemonic instructions and operation of the Motorola type MC6800 microprocessor are described in further detail in a publication entitled, "Programming the 6800 Microprocessor", by R. W. Southern, published in 1977 and available from Motorola Semiconductor Products Inc., Literature Distribution Center, P.O. Box 20924, Phoenix, AZ 85036.

TABLE I

SCAN SUBROUTINE

```
* THIS SUBROUTINE TAKES SIGNAL STRENGTH MEASURE-
* MENTS FROM SIX SECTOR ANTENNAS AND STORES THE
* LARGEST VALUE FOR EACH SECTOR. TWENTY FIVE
* SCANS THROUGH THE SIX SECTORS ARE TAKEN
*
0100                    ORG     $100
D000        PIA1        EQU     $D000    SIGNAL STRENGTH
                                         MEASUREMENT
E002        PIA2        EQU     $E002    SECTOR SELECTION
0100        IDAT        RMB     6        TABLE OF SIGNAL
                                         STRENGTH MAXIMA
0106        COUNT       RMB     2        NO. OF SAMPLES
                                         PER SECTOR
0108        TABAD       RMB     2        DATA ADDRESS IN
                                         TABLE
010A        SECTOR      RMB     1        SECTOR SELECTED
010B 00 50  DEND        FDB     $50      WAIT INTERVAL
010D        CNT         RMB     1        SCAN NUMBER
*
* SELECT SECTOR AND KEEP TRACK OF THE NUMBER
* OF SCANS THROUGH SIX SECTORS
*
1000                    ORG     $1000
1000 CE 01 00  SCAN     LDX     #IDAT    BEGINNING
                                         ADDRESS
                                         OF DATA
1003 FF 01 08           STX     TABAD
1006 6F 00              CLR     X        CLEAR TABLE
                                         OF MAXIMA
1008 6F 01              CLR     1,X
100A 6F 02              CLR     2,X
100C 6F 03              CLR     3,X
100E 6F 04              CLR     4,X
1010 6F 05              CLR     5,X
1012 7F 01 0D           CLR     CNT
1015 C6 01              LDA B   #1       GENERATE FIRST
```

TABLE I-continued

SCAN SUBROUTINE

|      |    |    |    |      |       |         | |
|------|----|----|----|------|-------|---------|---|
|      |    |    |    |      |       |         | SECTOR NUMBER |
| 1017 | 20 | 1B |    |      | BRA   | N2      | |
| 1019 | F6 | 01 | 0A | M1   | LDA B | SECTOR  | CALCULATE NEXT SECTOR ADDRESS |
| 101C | 5C |    |    |      | INC B |         | |
| 101D | C1 | 06 |    | M2   | CMP B | #6      | HAVE ALL SIX SECTORS BEEN SCANNED |
| 101F | 23 | 13 |    |      | BLS   | N2      | |
| 1021 | CE | 01 | 00 |      | LDX   | #IDAT   | REINITIALIZE POINTER TO TABLE |
| 1024 | FF | 01 | 08 |      | STX   | TABAD   | |
| 1027 | 7C | 01 | 0D |      | INC   | CNT     | HAVE 25 SCANS THROUGH THE 6 SECTORS BEEN COMPLETED? |
| 102A | B6 | 01 | 0D |      | LDA A | CNT     | |
| 102D | 81 | 19 |    |      | CMP A | #25     | NO |
| 102F | 2D | 01 |    |      | BLT   | M6      | |
| 1031 | 39 |    |    |      | RTS   |         | YES |
| 1032 | C6 | 01 |    | M6   | LDA B | #1      | |
| 1034 | F7 | 01 | 0A | N2   | STA B | SECTOR  | |
| 1037 | F7 | E0 | 02 |      | STA B | PIA2    | SELECT SECTOR |
| 103A | CE | 00 | 00 |      | LDX   | #0      | |
| 103D | 08 |    |    | WT   | INX   |         | WAIT FOR COMPLETION OF SECTOR SWITCHING |
| 103E | BC | 01 | 0B |      | CPX   | DEND    | |
| 1041 | 26 | FA |    |      | BNE   | WT      | |

```
*
* TAKE SIGNAL STRENGTH SAMPLES ON SELECTED
* SECTOR AND RETAIN LARGEST VALUE
*
```

|      |    |    |    |      |       |         | |
|------|----|----|----|------|-------|---------|---|
| 1043 | FE | 01 | 08 |      | LDX   | TABAD   | GET MAXIMUM FROM PREVIOUS SCAN |
| 1046 | E6 | 00 |    |      | LDA B | X       | |
| 1048 | FE | 01 | 06 |      | LDX   | COUNT   | |
| 104B | B6 | D0 | 00 |      | LDA A | PIA1    | CLEAR INPUT FLAG |
| 104E | B6 | D0 | 01 | LOOP | LDA A | PIA1+1  | WAIT FOR A/D CONVERSION COMPLETE |
| 1051 | 2A | FB |    |      | BPL   | LOOP    | |
| 1053 | B6 | D0 | 00 |      | LDA A | PIA1    | READ SAMPLE VALUE |
| 1056 | 11 |    |    |      | CBA   |         | IS NEW SAMPLE LARGEST? |
| 1057 | 23 | 01 |    |      | BLS   | N3      | NO |
| 1059 | 16 |    |    |      | TAB   |         | YES |
| 105A | 09 |    |    | N3   | DEX   |         | HAVE ALL SAMPLES BEEN TAKEN? |
| 105B | 26 | F1 |    |      | BNE   | LOOP    | |
| 105D | FE | 01 | 08 |      | LDX   | TABAD   | STORE LARGEST SIGNAL STRENGTH SAMPLE VALUE IN THE TABLE |
| 1060 | E7 | 00 |    |      | STA B | X       | |
| 1062 | 08 |    |    |      | INX   |         | |
| 1063 | FF | 01 | 08 |      | STX   | TABAD   | |
| 1066 | 7E | 10 | 19 |      | JMP   | M1      | |
| 1069 |    |    |    |      | END   |         | |

I claim:

1. A method of determining for a plurality of radio channels which of a plurality of antennas is receiving the strongest radio frequency (RF) signal experiencing to Rayleigh fading and transmitted from a plurality of remote stations each having an unknown location in a geographical area and transmitting on a different one of the radio channels, each of said antennas receiving RF signals from a corresponding portion of the geographical area and couplable to receiving means having an output signal, said method comprising the steps of:
   (a) tuning said receiving means to each of the radio channels in sequence; and
   (b) for each radio channel:
   (i) coupling said receiving means to each antenna in a predetermined sequence;
   (ii) sampling the receiving means ouput signal N times while coupled for a predetermined time interval to each antenna, where N is an integer number greater than one; and
   (iii) after sampling all antennas, selecting for communications on the radio channel the antenna for which at least one of its N samples has a magnitude greater than the magnitude of any of the N samples for all other antennas.

2. The method according to claim 1, further including the step of repeating said step (b) after a predetermined time.

3. The method according to claim 15, further including the step of repeating said step (b) at consecutive predetermined time intervals.

4. The method according to claim 1, wherein said sampling step (ii) further includes the step of converting each sample of the receiving means output signal to a digitized sample.

5. The method according to claim 1, wherein said selecting step (iii) further includes the steps of:
   selecting the largest sample for each antenna; and
   selecting for communications on the radio channel the antenna whose largest sample has a magnitude greater than the magnitude of the largest samples of all other antennas.

6. Apparatus for determining for a plurality of radio channels which of a plurality of antennas is receiving the strongest radio frequency (RF) signal experiencing Rayleigh fading and transmitted from a plurality of remote stations each having an unknown location in a geographical area and transmitting on a different one of the radio channels, each of said antennas receiving RF signals from a corresponding portion of the geographical area and couplable to receiving means having an output signal, said apparatus comprising:
   means for tuning said receiving means to each of the radio channels in sequence;
   means for coupling for each radio channel said receiving means to each antenna in a predetermined sequence;
   means for sampling for each radio channel the receiving means output signal N times while coupled for a predetermined time interval to each antenna, where N is an integer number greater than one; and
   means for selecting for communications on each radio channel the antenna for which at least one of its N samples has a magnitude greater than the magnitude of any of the N samples for all other antennas.

7. The apparatus according to claim 6, wherein said sampling means takes a second set of N samples of the receiving means output signal for each antenna after a predetermined time.

8. The apparatus according to claim 6, wherein said sampling means takes additional sets of N samples of the receiving means output signal for each antenna during consecutive predetermined time intervals.

9. The apparatus according to claim 6, wherein said sampling means further includes means for converting each sample of the receiving means output signal to a digitized sample.

10. The apparatus according to claim 6, wherein said selecting means further includes means for selecting the largest sample for each antenna.

11. A method of determining for each radio channel which of a plurality of antennas is receiving the strongest radio frequency (RF) signal experiencing Rayleigh fading and transmitted from a plurality of remote stations each having an unknown location in a geographical area and transmitting on a different radio channel, each of said antennas receiving RF signals from the geographical area and couplable to receiving means having an output signal, said method comprising the steps of:
   (a) tuning said receiving means to each of the radio channels in sequence; and
   (b) for each radio channel:
      (i) coupling said receiving means to each antenna in a predetermined sequence;
      (ii) sampling the receiving means output signal N times while coupled for a predetermined time interval to each antenna, where N is an integer number greater than one; and
      (iii) after sampling all antennas, selecting the antenna for which at least one of its N samples has a magnitude greater than the magnitude of any of the N samples for all other antennas.

12. The method according to claim 11, further including the step of repeating said step (b) after a predetermined time.

13. The method according to claim 11, further including the step of repeating step (b) at consecutive predetermined time intervals.

14. The method according to claim 11, wherein said sampling step (ii) further includes the step of converting each sample of the receiving means output signal to a digitized sample.

15. The method according to claim 11, wherein said selecting step (iii) further includes the steps of:
   selecting the largest sample for each antenna; and
   selecting for communications on the radio channel the antenna whose largest sample has a magnitude greater than the magnitude of the largest samples of all other antennas.

16. Apparatus for determining for each radio channel which of a plurality of antennas is receiving the strongest radio frequency (RF) signal experiencing Rayleigh fading and transmitted from a plurality of remote stations each having an unknown location in a geographical area and transmitting on a different radio channel, each of said antennas receiving RF signals from the geographical area and couplable to receiving means having an output signal, said apparatus comprising:
   means for tuning said receiving means to each of the radio channels in sequence;
   means for coupling for each radio channel said receiving means to each antenna in a predetermined sequence;
   means for sampling for each radio channel the receiving means output signal N times while coupled for a predetermined time interval to each antenna, where N is an integer number greater than one; and
   means for selecting for each radio channel the antenna for which at least one of its N samples has a magnitude greater than the magnitude of any of the N samples for all other antennas.

17. The apparatus according to claim 16, wherein said sampling means takes a second set of N samples of the receiving means output signal for each antenna after a predetermined time.

18. The apparatus according to claim 16, wherein said sampling means takes additional sets of N samples of the receiving means output signal for each antenna during consecutive predetermined time intervals.

19. The apparatus according to claim 16, wherein said sampling means further includes means for converting each sample of the receiving means output signal to a digitized sample.

20. The apparatus according to claim 16, wherein said selecting means further includes means for selecting the largest sample for each antenna.

21. A method of determining for each radio channel the strength of the radio frequency (RF) signal experiencing Rayleigh fading and received by a plurality of antennas from a plurality of remote stations each having an unknown location in a geographical area and transmitting on a different radio channel, each of said antennas receiving RF signals from the geographical area and couplable to receiving means having an output signal, said method comprising the steps of:
(a) tuning said receiving means to each of the radio channels in sequence; and
(b) for each radio channel:
(i) coupling said receiving means to each antenna in a predetermined sequence;
(ii) sampling the receiving means output signal N times while coupled for a predetermined time interval to each antenna, where N is an integer number greater than one; and
(iii) after sampling all antennas, selecting the sample which has a magnitude greater than the magnitude of any of the other samples.

22. The method according to claim 21, further including the step of repeating said step (b) after a predetermined time.

23. The method according to claim 21, further including the step of repeating step (b) at consecutive predetermined time intervals.

24. The method according to claim 21, wherein said sampling step (ii) further includes the step of converting each sample of the receiving means output signal to a digitized sample.

25. The method according to claim 21, wherein said selecting step (iii) further includes the steps of:
selecting the largest sample for each antenna; and
selecting the largest sample which has a magnitude greater than the magnitude of the largest samples of all other antennas.

26. Apparatus for determining for each radio channel the stength of the radio frequency (RF) signal experiencing Rayleigh fading and receiving by a plurality of antennas from a plurality of remote stations each having an unknown location in a geographical area and transmitting on a different radio channel, each of said antennas receiving RF signals from the geographical area and couplable to receiving means having an output signal, said apparatus comprising:
means for tuning said receiving means to each of the radio channels in sequence;
means for coupling for each radio channel said receiving means to each antenna in a predetermined sequence;
means for sampling for each radio channel the receiving means output signal N times while coupled for a predetermined time interval to each antenna; where N is an integer number greater than one; and
means for selecting the sample which has a magnitude greater than the magnitude of any of the other samples.

27. The apparatus according to claim 26, wherein said sampling means takes a second set of N samples of the receiving means output signal for each antenna after a predetermined time.

28. The apparatus according to claim 26, wherein said sampling means takes additional sets of N samples of the receiving means output signal for each antenna during consecutive predetermined time intervals.

29. The apparatus according to claim 26, wherein said sampling means further includes means for converting each sample of the receiving means output signal to a digitized sample.

30. The apparatus according to claim 26, wherein said selecting means further includes means for selecting the largest sample for each antenna.

* * * * *

UNITED STATES PATENT AND TRADEMARK OFFICE
CERTIFICATE OF CORRECTION

PATENT NO.   :   4,549,311
DATED        :   October 22, 1985
INVENTOR(S)  :   Michael J. McLaughlin It is certified that error appears in the above-identified patent and that said Letters Patent is hereby corrected as shown below:

In Column 8, line 57, delete the word "ouput" and insert --output--.

In Column 9, line 1, delete the number "15" and insert --1--.

In Column 12, line 14, delete the semicolon ";" and insert a comma --,--.

Signed and Sealed this

Third Day of June 1986

[SEAL]

Attest:

*Attesting Officer*

DONALD J. QUIGG

*Commissioner of Patents and Trademarks*